United States Patent
Lee et al.

(10) Patent No.: US 10,165,613 B2
(45) Date of Patent: Dec. 25, 2018

(54) CONTROL METHOD FOR BLUETOOTH COMMUNICATION AND BLUETOOTH LOW ENERGY COMMUNICATION

(71) Applicant: HTC Corporation, Taoyuan (TW)

(72) Inventors: Lo-Chien Lee, Taoyuan (TW);
Chih-Yuan Chien, Taoyuan (TW);
Kai-Hsiu Chen, Taoyuan (TW);
Wen-Yuan Chen, Taoyuan (TW)

(73) Assignee: HTC Corporation, Taoyuan (TW)

( * ) Notice: Subject to any disclaimer, the term of this patent is extended or adjusted under 35 U.S.C. 154(b) by 0 days.

(21) Appl. No.: 15/475,115

(22) Filed: Mar. 30, 2017

(65) Prior Publication Data

US 2018/0103499 A1     Apr. 12, 2018

Related U.S. Application Data

(60) Provisional application No. 62/404,777, filed on Oct. 6, 2016.

(51) Int. Cl.
| | |
|---|---|
| *H04B 7/185* | (2006.01) |
| *H04W 76/15* | (2018.01) |
| *H04W 4/80* | (2018.01) |
| *H04W 76/11* | (2018.01) |

(52) U.S. Cl.
CPC ............ *H04W 76/15* (2018.02); *H04W 4/80* (2018.02); *H04W 76/11* (2018.02)

(58) Field of Classification Search
CPC . H04W 76/025; H04W 4/008; H04W 76/021; H04W 76/02; H04B 3/544; H04B 7/18558
See application file for complete search history.

(56) References Cited

U.S. PATENT DOCUMENTS

| | | | |
|---|---|---|---|
| 2008/0139186 A1* | 6/2008 | Ringland | H04M 1/2745 455/415 |
| 2008/0304458 A1* | 12/2008 | Aghvami | H04L 69/08 370/338 |
| 2011/0281519 A1* | 11/2011 | Reuss | H04W 8/005 455/41.2 |
| 2012/0231835 A1* | 9/2012 | Zhang | H04W 88/06 455/552.1 |
| 2015/0289295 A1* | 10/2015 | Granbery | H04W 76/023 370/230 |
| 2016/0105859 A1* | 4/2016 | Zhu | H04W 76/10 370/350 |
| 2016/0360341 A1* | 12/2016 | Srivatsa | H04L 67/104 |
| 2017/0053110 A1* | 2/2017 | Wang | G06F 21/32 |
| 2017/0289739 A1* | 10/2017 | Trip | H04W 4/80 |

* cited by examiner

*Primary Examiner* — Andrew Wendell
(74) *Attorney, Agent, or Firm* — CKC & Partners Co., Ltd.

(57) ABSTRACT

A control method, suitable for an electronic device, includes following operations. A first connection is established based on a classic Bluetooth protocol or a Bluetooth Low Energy protocol from the electronic device to a first target device. A Bluetooth identifier of the first target device acquired in the first connection is recorded. The Bluetooth identifier of the first target device is shared. The Bluetooth identifier is utilized to establish a second connection based on the classic Bluetooth protocol or the Bluetooth Low Energy protocol to the first target device. The first connection and the second connection are established based on different protocols.

17 Claims, 6 Drawing Sheets

CONTROL METHOD FOR BLUETOOTH COMMUNICATION AND BLUETOOTH LOW ENERGY COMMUNICATION

RELATED APPLICATIONS

This application claims priority to U.S. Provisional Application Ser. No. 62/404,777, filed Oct. 6, 2016, which is herein incorporated by reference.

BACKGROUND

Field of Invention

The present application relates to a communication system. More particularly, the present application relates to a control method related to a management of connections based on a Bluetooth protocol and a Bluetooth Low Energy Protocol.

Description of Related Art

Bluetooth is a wireless technology standard for exchanging data over short distances among fixed and mobile devices. Based on the Classic Bluetooth technology, two devices are able to exchange data in various formats, such as text files, streaming audios, streaming videos, etc.

Bluetooth low energy (BLE) is a wireless communication solution, which is popular in various applications such as healthcare, fitness, beacon, security, etc. BLE technology is intended to provide commutation capability over wireless connections with reduced power consumption and cost. Compared to the Classic Bluetooth technology, the BLE technology is mainly utilized to exchange data with relatively lower data rate.

SUMMARY

An embodiment of the disclosure provides a control method, which is suitable for an electronic device. The control method includes following operations. A first connection is established based on a classic Bluetooth protocol or a Bluetooth Low Energy protocol from the electronic device to a first target device. A Bluetooth identifier of the first target device acquired in the first connection is recorded. The Bluetooth identifier of the first target device is shared. The Bluetooth identifier is utilized to establish a second connection based on the classic Bluetooth protocol or the Bluetooth Low Energy protocol to the first target device. The first connection and the second connection are established based on different protocols.

Another embodiment of the disclosure also provides a non-transitory computer readable storage medium with a computer program to execute aforesaid control method.

Another embodiment of the disclosure also provides an electronic device. The electronic device includes a first communication module and a processing circuit. The first communication module is configured for establishing a first connection based on a classic Bluetooth protocol or a Bluetooth Low Energy protocol from the electronic device to a target electronic device. The processing circuit is coupled with the first communication module. The processing circuit is adapted to record a Bluetooth identifier of the first target device acquired in the first connection. The processing circuit is further adapted to share the Bluetooth identifier of the first target device. The Bluetooth identifier is utilized to establish a second connection based on the classic Bluetooth protocol or the Bluetooth Low Energy protocol to the first target device. The first connection and the second connection are established based on different protocols.

It is to be understood that both the foregoing general description and the following detailed description are by examples, and are intended to provide further explanation of the invention as claimed.

BRIEF DESCRIPTION OF THE DRAWINGS

The disclosure can be more fully understood by reading the following detailed description of the embodiment, with reference made to the accompanying drawings as follows.

DETAILED DESCRIPTION

Reference will now be made in detail to the present embodiments of the disclosure, examples of which are illustrated in the accompanying drawings. Wherever possible, the same reference numbers are used in the drawings and the description to refer to the same or like parts.

Figure 1:
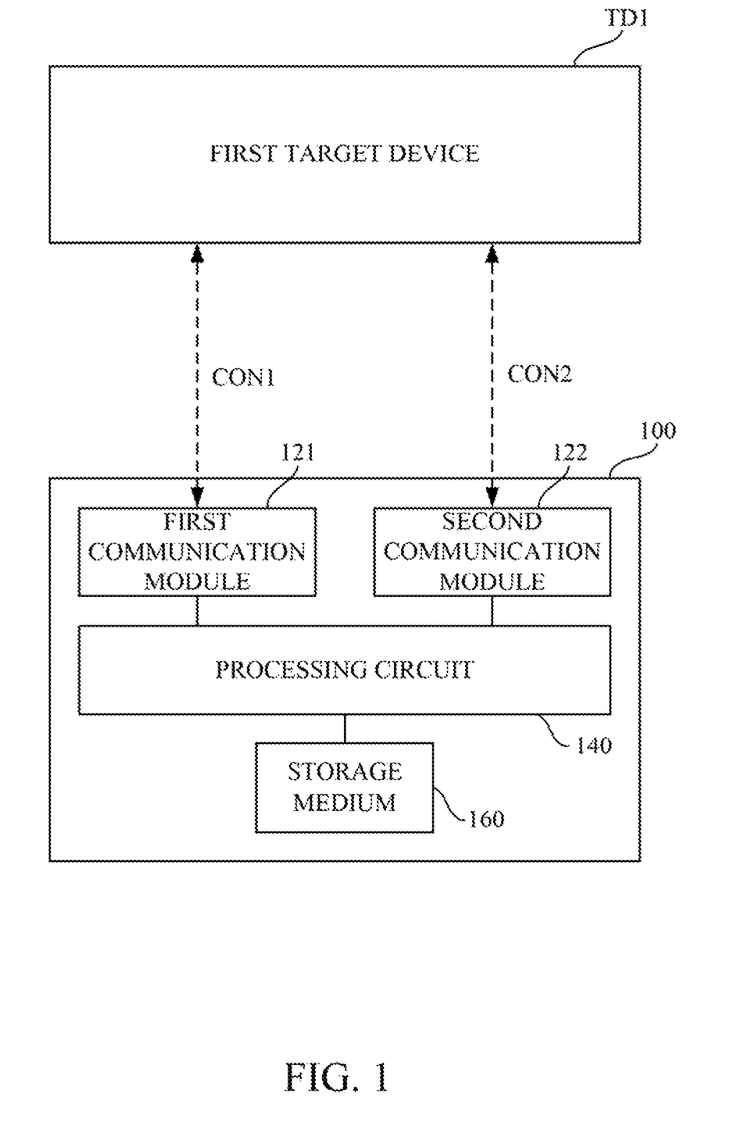
FIG. 1 is a schematic diagram illustrating an electronic device according to an embodiment of this disclosure.

Reference is made to FIG. 1. FIG. 1 is a schematic diagram illustrating an electronic device 100 according to an embodiment of this disclosure. In the embodiment shown in FIG. 1, the electronic device 100 includes a first communication module 121, a second communication module 122, a processing circuit 140 and a storage medium 160. The processing circuit 140 is coupled to the first communication module 121, the second communication module 122 and the storage medium 160.

In this embodiment, the electronic device 100 is able to wireless connected to a first target device TD1 by the first communication module 121 and the second communication module 122. The first communication module 121 is configured for establishing a first connection CON1 based on a classic Bluetooth protocol or a Bluetooth Low Energy (BLE) protocol from the electronic device 100 to the target electronic device TD1. The second communication module 122 is configured for establishing a second connection CON2 based on the classic Bluetooth protocol or the BLE protocol from the electronic device 100 to the target electronic device TD1.

The first connection CON1 established by the first communication module 121 and the second connection CON2 established by the second communication module 122 are based on different protocols.

In an embodiment, the first connection CON1 established by the first communication module 121 is based on the classic Bluetooth protocol, and the second connection CON2 established by the second communication module 122 is based on the BLE protocol.

In another embodiment, the first connection CON1 established by the first communication module 121 is based on the BLE protocol, and the second connection CON2 established by the second communication module 122 is based on the classic Bluetooth protocol.

In other words, the electronic device 100 and the first target device TD1 are both equipped with necessary components for the classic Bluetooth protocol and the BLE protocol. In general, the classic Bluetooth protocol is capable for exchanging various types of data (including voice call data, streaming audios and streaming videos, text files, and control signals) between the electronic device 100 and the first target device TD1 with relatively higher power consumption and relatively faster transmission speed. The BLE protocol is capable for exchanging data with relatively lower power consumption. Some types of data (e.g., voice call data, streaming audios and streaming videos) are not supported to be transmitted over the BLE protocol. Since the electronic device 100 and the first target device TD1 are able to communicate with both of the classic Bluetooth protocol and the BLE protocol, different types of data can be classified and transmitted over the classic Bluetooth protocol or the BLE protocol respectively.

The electronic device 100 in the embodiment can be a Bluetooth dongle, a Bluetooth hub, a link box, a set-up box, a mobile phone, a smart phone, a computer or any device capable of communicating over Bluetooth and Bluetooth Low Energy (BLE) protocols. The first target device TD1 in the embodiment can also be a Bluetooth dongle, a Bluetooth hub, a link box, a set-up box, a mobile phone, a smart phone, a computer or any device capable of communicating over Bluetooth and Bluetooth Low Energy (BLE) protocols.

In an embodiment, the first communication module 121 and the second communication module 122 are implemented by separate circuit components. For example, the first communication module 121 is implemented as a single-mode classic Bluetooth transceiver, and the second communication module 122 is implemented as a single-mode BLE transceiver.

In another embodiment, the first communication module 121 and the second communication module 122 are implemented as two software programs executed on a dual-mode integrated Bluetooth transceiver. The dual-mode integrated Bluetooth transceiver is able to establish the classic Bluetooth connection and also the BLE connection. In other words, the first communication module 121 and the second communication module 122 can be realized by one hardware circuit, which is the dual-mode integrated Bluetooth transceiver.

The processing circuit 140 can be a processor, a system-on-chip (SoC) circuit, a central processing unit (CPU) and/or similar processing component. The storage medium 160 can be a flash memory, a read-only memory (ROM), a hard disk or a non-transitory computer readable media.

In a procedure to establish the classic Bluetooth connection, a user of the electronic device shall scan for target device around the electronic device. If a target device is found among other results, the user is required to select the target device. After the selection, the electronic device will be paired with the target device, and the classic Bluetooth connection will be established. In another procedure to establish the BLE connection between the electronic device and the target device, the user of the electronic device may have to scan and select the target device again. An embodiment of the disclosure is able to simplify aforesaid procedures.

Figure 2:
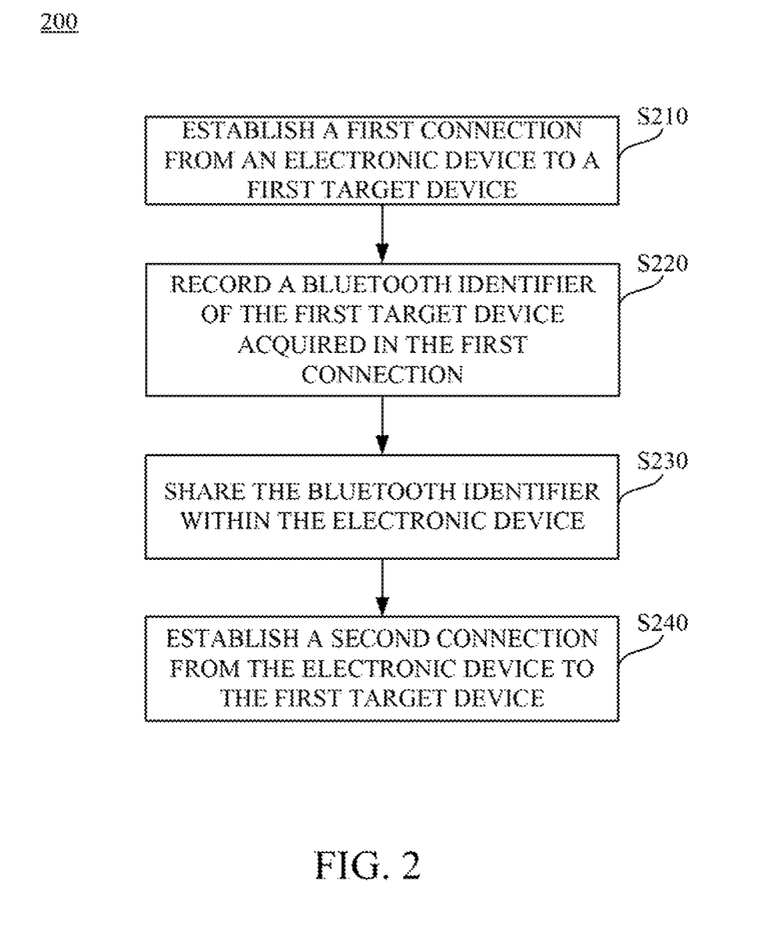
FIG. 2 is a flow chart illustrating a control method according to an embodiment the disclosure.

Reference is made to FIG. 2, which is a flow chart illustrating a control method 200 according to an embodiment the disclosure. The control method 200 is suitable to be utilized by the electronic device 100 shown in FIG. 1. As shown in FIG. 1 and FIG. 2, operation S210 of the control method 200 is executed to establishing the first connection CON1 by the first communication module 121 from the electronic device 100 to the first target device TD1.

It is assumed that the first communication module 121 is implemented as the classic Bluetooth transceiver, and the first communication module 121 is capable of establishing the classic Bluetooth connection. In an example, the first communication module 121 is triggered by the processing circuit 140 to scan a Bluetooth transmission channel. The user can select among the Bluetooth scan result. When the first target device TD1 is selected, the first connection CON1 can be established based on the classic Bluetooth protocol. If this is the first time that the electronic device 100 forms the classic Bluetooth connection to the first target device TD1, a pairing process is required between the electronic device 100 and first target device TD1.

In another example, the electronic device 100 has been paired with and connected to the classic Bluetooth connection to the first target device TD1, the electronic device 100 is able to reconnect to the first target device TD1 without pairing again.

During the first connection in operation S210, the first communication module 121 will acknowledge a Bluetooth identifier of the first target device TD1. The Bluetooth identifier can be a Bluetooth device name of the first target device TD1 or a Bluetooth device address of the first target device TD1. The Bluetooth device name can be a string defined by a manufacturer of the first target device TD1. The Bluetooth device name can include a universally unique identifier of the first target device TD1. The Bluetooth device address corresponding to the first target device TD1 can be a network address including a combination of 12 alphanumeric characters.

As shown in FIG. 1 and FIG. 2, operation S220 of the control method 200 is executed by the processing circuit 140 to record the Bluetooth identifier of the first target device TD1 acquired in the first connection CON1. In an embodiment, the Bluetooth identifier can be recorded into the storage medium 160.

Afterward, operation S230 of the control method 200 is executed by the processing circuit 140 to share the Bluetooth identifier of the first target device TD1 within the electronic device 100. In this embodiment, the Bluetooth identifier can be shared to the second communication module 122. Therefore, the second communication module 122 will acknowledge the Bluetooth identifier of the first target device TD1 without pairing or selecting procedures.

Afterward, operation S240 of the control method 200 is executed by the second communication module 122 to establish a second connection CON2 to the first target device. The second communication module 122 utilizes the Bluetooth identifier acquired in the first connection CON1 to establish the second connection CON2. According to aforesaid assumption that the first connection CON1 established by the first communication module 121 is based on the classic Bluetooth protocol, the second communication module 122 is configured to establish the second connection CON2 based on the BLE protocol. The first target device TD1 can be recognized by the second communication module 122 with the same Bluetooth identifier acquired in the first connection CON1. Therefore, after the first connection CON1 is established, the second communication module 122 is able to connect to the desired target (i.e., the first target device TD1) over the second connection CON2 automatically without asking the user to select a target from a list of scan results.

Figure 3:
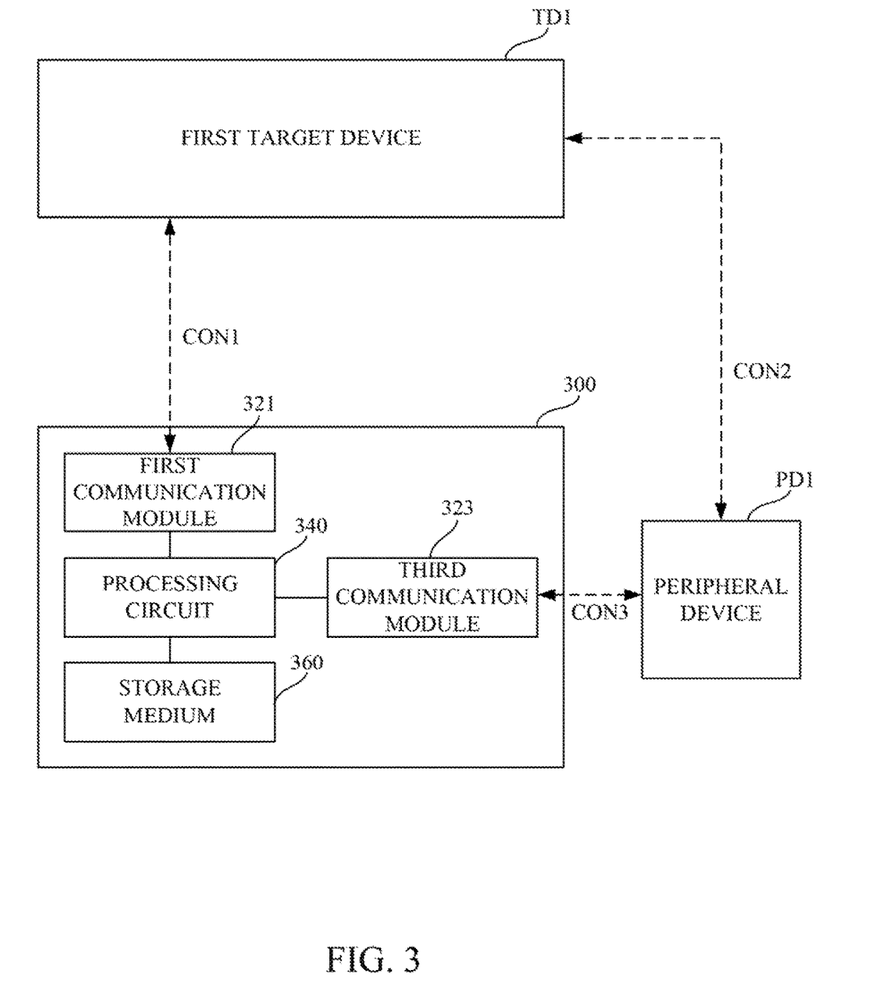
FIG. 3 is a schematic diagram illustrating an electronic device according to another embodiment of this disclosure.
Figure 4:
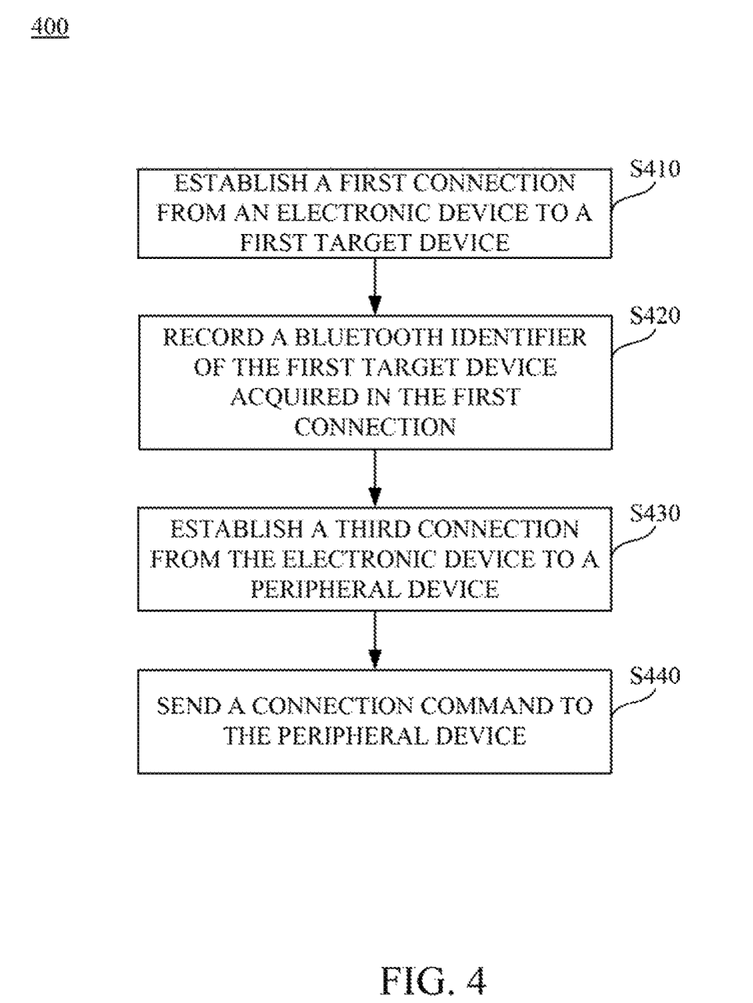
FIG. 4 is a flow chart illustrating a control method according to an embodiment the disclosure.

Reference is made to FIG. 3 and FIG. 4. FIG. 3 is a schematic diagram illustrating an electronic device 300 according to another embodiment of this disclosure. FIG. 4 is a flow chart illustrating a control method 400 according to an embodiment the disclosure. The control method 400 is suitable to be utilized by the electronic device 300 in FIG. 3.

As shown in FIG. 3, the electronic device 300 includes a first communication module 321, a third communication module 323, a processing circuit 340 and a storage medium 360. The processing circuit 340 is coupled to the first communication module 321, the third communication module 323 and the storage medium 360.

In this embodiment, the electronic device 300 is able to wireless connected to a first target device TD1 by the first communication module 321. The first communication module 321 is configured for establishing a first connection CON1 based on the classic Bluetooth protocol or the BLE protocol from the electronic device 300 to the target electronic device TD1. The third communication module 323 is configured for establishing a third connection CON3 based on a peer-to-peer communication protocol. The peer-to-peer communication protocol may include an Ad-hoc protocol, a WiFi-direct protocol, a Zigbee protocol or any equivalent peer-to-peer communication protocol. The processing circuit 340 can be a processor, a system-on-chip (SoC) circuit, a central processing unit (CPU) and/or similar processing component. The storage medium 360 can be a flash memory, a read-only memory (ROM), a hard disk or a non-transitory computer readable media.

As shown in FIG. 3 and FIG. 4, operation S410 of the control method 400 is executed to establishing the first connection CON1 by the first communication module 321 from the electronic device 300 to the first target device TD1.

During the first connection in operation S410, the first communication module 321 will acknowledge a Bluetooth identifier of the first target device TD1. The Bluetooth identifier can be a Bluetooth device name of the first target device TD1 or a Bluetooth device address of the first target device TD1.

As shown in FIG. 3 and FIG. 4, operation S420 of the control method 400 is executed by the processing circuit 440 to record the Bluetooth identifier of the first target device TD1 acquired in the first connection CON1. In an embodiment, the Bluetooth identifier can be recorded into the storage medium 360.

Afterward, operation S430 of the control method 400 is executed by the processing circuit 340 to trigger the third communication circuit 323 for establishing the third connection CON3 from the electronic device 300 to a peripheral device PD1.

Afterward, the Bluetooth identifier acquired in the first connection CON1 by the first communication module 321 can be shared to the peripheral device PD1. Operation S440 of the control method 400 is executed by the processing circuit 340 to sending a connection command to the peripheral device PD1. The connection command includes the Bluetooth identifier of the first target device TD1. The connection command is configured to trigger the peripheral device PD1 to establish a second connection CON2 to the first target device TD1. In this embodiments, the second connection CON2 is established based on the classic Bluetooth protocol or the BLE protocol from the electronic device 300 to the target electronic device TD1.

It is noted that the first connection CON1 and the second connection CON2 are established by different protocols. In an example, the first connection CON1 can be established based on the classic Bluetooth protocol, and the second connection CON2 can be established based on the BLE protocol. In another example, the first connection CON1 can be established based on the BLE protocol, and the second connection CON2 can be established based on the classic Bluetooth protocol.

In aforesaid embodiment, the electronic device 300 is able share the Bluetooth identifier of the first target device TD1 acquired in the first connection CON1 to the peripheral device PD1. The Bluetooth identifier of the first target device TD1 can be shared by the connection command sent from the electronic device 300 to the peripheral device PD1. Therefore, the peripheral device PD1 is able to acknowledge the Bluetooth identifier of the first target device TD1 without pairing or selecting procedures. The control method 400 in FIG. 4 is able to speed up the connection procedures if the user has the electronic device 300 and the peripheral device PD1, and both of which are required to be connected to the first target device TD1.

Figure 5:
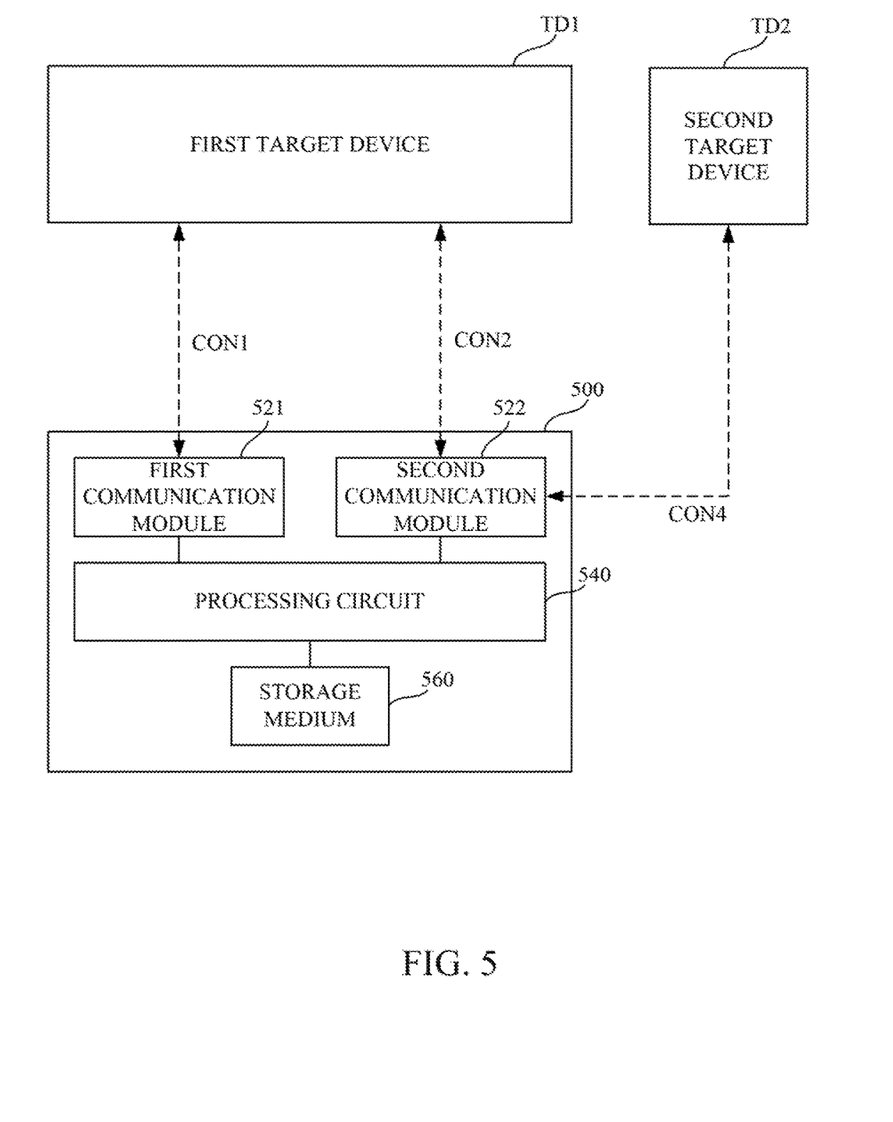
FIG. 5 is a schematic diagram illustrating an electronic device according to another embodiment of this disclosure.
Figure 6:
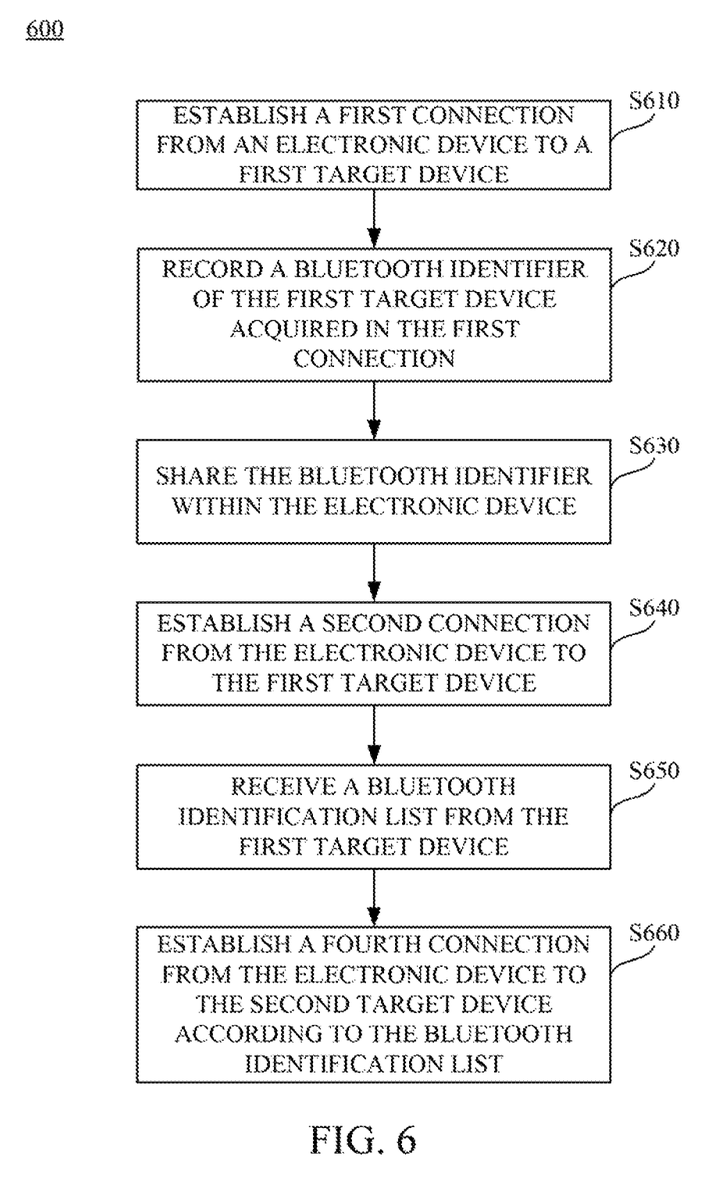
FIG. 6 is a flow chart illustrating a control method according to an embodiment the disclosure.

Reference is made to FIG. 5 and FIG. 6. FIG. 5 is a schematic diagram illustrating an electronic device 500 according to another embodiment of this disclosure. FIG. 6 is a flow chart illustrating a control method 600 according to an embodiment the disclosure. The control method 600 is suitable to be utilized by the electronic device 500 in FIG. 5.

As shown in FIG. 5, the electronic device 500 includes a first communication module 521, a second communication module 522, a processing circuit 540 and a storage medium 560. The processing circuit 540 is coupled to the first communication module 521, the second communication module 522 and the storage medium 560.

In this embodiment, the electronic device 500 is able to wireless connected to a first target device TD1 by the first communication module 521. The first communication module 521 is configured for establishing a first connection CON1 based on the classic Bluetooth protocol or the BLE protocol from the electronic device 500 to the target electronic device TD1. The second communication module 522 is configured for establishing a second connection CON2 based on the classic Bluetooth protocol or the BLE protocol from the electronic device 500 to the target electronic device TD1. The first connection CON1 and the second connection CON2 are based on different protocols. Details about the first connection CON1 established by first communication module 521 and the second connection CON2 established by the second communication module 522 can be referred to the electronic device 100 and the control method 200 discussed in embodiments of FIG. 1 and FIG. 2, and not to be repeated herein.

The processing circuit 540 can be a processor, a system-on-chip (SoC) circuit, a central processing unit (CPU) and/or similar processing component. The storage medium 560 can be a flash memory, a read-only memory (ROM), a hard disk or a non-transitory computer readable media.

As shown in FIG. 6, operations S610, S620, S630 and S640 of the control method 600 are similar to S210, S220, S230 and S240 of the control method 200 in aforesaid embodiment discussed in embodiments of FIG. 1 and FIG. 2, and not to be repeated herein.

As shown in FIG. 5 and FIG. 6, the control method 600 further includes operation S650 executed by the processing circuit 540 of the electronic device 500 to receive a Bluetooth identification list from the first target device TD1. The Bluetooth identification list includes a Bluetooth device name of a second target device TD2 or a Bluetooth device address of the second target device TD2. In an embodiment, the second target device TD2 registered in the Bluetooth identification list is currently connected with the first target device TD1 or has been previously connected with the first target device TD1. Therefore, the first target device TD1 will have information about the Bluetooth device name or the Bluetooth device address of the second target device TD2.

The Bluetooth identification list can be transmitted from the first target device TD1 to the electronic device 500 over the first connection CON1 or the second connection CON2. When the Bluetooth identification list is received by the electronic device 500. The control method 600 further includes operation S660 executed by the processing circuit 540 of the electronic device 500 to establish a fourth connection CON4 from the electronic device 500 to the second target device TD2 according to the Bluetooth identification list. The fourth connection CON4 is based on the classic Bluetooth protocol or the Bluetooth Low Energy protocol.

In this embodiment, the fourth connection CON4 is based on the same protocol as the second connection CON2. The fourth connection CON4 is based on different protocol from the first connection CON1. In an embodiment, the first connection CON1 is based on the classic Bluetooth protocol; the second connection CON2 and the fourth connection CON4 are based on the BLE protocol. In another embodiment, the first connection CON1 is based on the BLE protocol; the second connection CON2 and the fourth connection CON4 are based on the classic Bluetooth protocol.

Although the present invention has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. A control method, suitable for an electronic device, the control method comprising:
    establishing, by a classic Bluetooth communication module, a first connection based on a classic Bluetooth protocol from the electronic device to a first target device, wherein the electronic device comprises the classic Bluetooth communication module and a Bluetooth Low Energy communication module;
    recording, by the electronic device, a Bluetooth identifier of the first target device acquired in the first connection; and
    automatically sharing, by the electronic device, the Bluetooth identifier of the first target device from the classic Bluetooth communication module to the Bluetooth Low Energy communication module, wherein the Bluetooth identifier is utilized by the Bluetooth Low Energy communication module to establish a second connection based on the Bluetooth Low Energy protocol to the first target device.

2. The control method of claim 1, wherein the Bluetooth identifier of the first target device comprises a Bluetooth device name or a Bluetooth device address.

3. The control method of claim 1, wherein in the operation of sharing the Bluetooth identifier of the first target device, the control method comprises:
    establishing a third connection from the electronic device to a peripheral device; and
    sending a connection command to the peripheral device, wherein the connection command comprises the Bluetooth identifier of the first target device, the connection command is configured to trigger the peripheral device to establish the second connection to the first target device.

4. The control method of claim 3, wherein the third connection is based on a peer-to-peer communication protocol.

5. The control method of claim 1, further comprising:
    receiving a Bluetooth identification list from the first target device, the Bluetooth identification list comprising a Bluetooth device name of a second target device or a Bluetooth device address of the second target device; and
    establishing a fourth connection from the electronic device to the second target device according to the Bluetooth identification list, wherein the fourth connection is based on the classic Bluetooth protocol or the Bluetooth Low Energy protocol.

6. The control method of claim 5, wherein the second target device is connected with the first target device or previously connected with the first target device.

7. An electronic device, comprising:
    a classic Bluetooth communication module, configured for establishing a first connection based on a classic Bluetooth protocol from the electronic device to a target electronic device;
    a Bluetooth Low Energy communication module;
    a processing circuit, coupled with the classic Bluetooth communication module and the Bluetooth Low Energy communication module, the processing circuit being adapted to:
        record a Bluetooth identifier of the first target device acquired in the first connection; and
        automatically share the Bluetooth identifier of the first target device from the classic Bluetooth communication module to the Bluetooth Low Energy communication module;
    wherein the Bluetooth Low Energy communication module utilizes the Bluetooth identifier of the first target device for establishing a second connection to the first target device based on the Bluetooth Low Energy protocol after the first connection is established.

8. The electronic device of claim 7, wherein the Bluetooth identifier of the first target device comprises a Bluetooth device name or a Bluetooth device address.

9. The electronic device of claim 7, wherein the electronic device further comprises a third communication module coupled with the processing circuit, the third communication module is configured for establishing a third connection from the electronic device to a peripheral device, the processing unit is adapted to share the Bluetooth identifier of the first target device with the peripheral device by sending a connection command to the peripheral device, the connection command comprises the Bluetooth identifier of the first target device, the connection command is configured to trigger the peripheral device to establish the second connection to the first target device.

10. The electronic device of claim 9, wherein the third connection is based on a peer-to-peer communication protocol.

11. The electronic device of claim 7, wherein the processing circuit is further adapted to:

receive a Bluetooth identification list from the first target device, wherein the Bluetooth identification list comprises a Bluetooth device name of a second target device or a Bluetooth device address of the second target device; and establish a fourth connection from the electronic device to the second target device according to the Bluetooth identification list, wherein the fourth connection is based on the classic Bluetooth protocol or the Bluetooth Low Energy protocol.

12. The electronic device of claim 11, wherein the second target device is connected with the first target device or previously connected with the first target device.

13. A non-transitory computer readable storage medium with a computer program to execute a control method, wherein the control method comprises:

establishing, by a classic Bluetooth communication module, a first connection based on a classic Bluetooth protocol from an electronic device to a first target device, wherein the electronic device comprises the classic Bluetooth communication module and a Bluetooth Low Energy communication module;

recording, by the electronic device, a Bluetooth identifier of the first target device acquired in the first connection; and automatically sharing, by the electronic device, the Bluetooth identifier of the first target device from the classic Bluetooth communication module to the Bluetooth Low Energy communication module, wherein the Bluetooth identifier is utilized by the Bluetooth Low Energy communication module to establish a second connection based on the Bluetooth Low Energy protocol to the first target device.

14. The non-transitory computer readable storage medium of claim 13, wherein the Bluetooth identifier of the first target device comprises a Bluetooth device name or a Bluetooth device address.

15. The non-transitory computer readable storage medium of claim 13, wherein in the operation of sharing the Bluetooth identifier of the first target device, the control method comprises:

establishing a third connection from the electronic device to a peripheral device; and sending a connection command to the peripheral device, wherein the connection command comprises the Bluetooth identifier of the first target device, the connection command is configured to trigger the peripheral device to establish the second connection to the first target device.

16. The non-transitory computer readable storage medium of claim 15, wherein the third connection is based on a peer-to-peer communication protocol.

17. The non-transitory computer readable storage medium of claim 13, further comprising:

receiving a Bluetooth identification list from the first target device, the Bluetooth identification list comprising a Bluetooth device name of a second target device or a Bluetooth device address of the second target device; and establishing a fourth connection from the electronic device to the second target device according to the Bluetooth identification list, wherein the fourth connection is based on the classic Bluetooth protocol or the Bluetooth Low Energy protocol.

* * * * *